(12) United States Patent
Llagostera

(10) Patent No.: US 11,831,530 B2
(45) Date of Patent: Nov. 28, 2023

(54) JITTER DETERMINATION METHOD, JITTER DETERMINATION MODULE, AND PACKET-BASED DATA STREAM RECEIVER

(71) Applicant: Rohde & Schwarz GmbH & Co. KG, Munich (DE)

(72) Inventor: Anna Llagostera, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 17/742,976

(22) Filed: May 12, 2022

(65) Prior Publication Data

US 2022/0407792 A1 Dec. 22, 2022

(30) Foreign Application Priority Data

Jun. 18, 2021 (EP) .................................... 21180353

(51) Int. Cl.
*H04L 43/087* (2022.01)

(52) U.S. Cl.
CPC .................. *H04L 43/087* (2013.01)

(58) Field of Classification Search
CPC ..................................................... H04L 43/087
USPC ........................................................ 709/224
See application file for complete search history.

(56) References Cited

U.S. PATENT DOCUMENTS

| | | | |
|---|---|---|---|
| 5,790,543 A * | 8/1998 | Cloutier | H04Q 11/0478 375/E7.278 |
| 8,280,994 B2 * | 10/2012 | Blouin | H04L 43/0817 709/224 |
| 9,077,667 B2 * | 7/2015 | Sridhar | H04L 65/65 |
| 9,237,108 B2 * | 1/2016 | Sun | H04L 47/283 |
| 9,882,818 B2 * | 1/2018 | Shao | H04W 28/0236 |
| 10,142,214 B2 * | 11/2018 | Kim | H04L 65/1059 |
| 10,454,811 B2 * | 10/2019 | Lee | H04L 43/0858 |
| 10,630,567 B1 * | 4/2020 | Carson | H04L 47/2441 |
| 10,911,211 B1 * | 2/2021 | Kratz | H04J 3/0667 |
| 10,917,352 B1 * | 2/2021 | Hanes | H04L 69/16 |
| 10,986,001 B2 * | 4/2021 | Guo | H04L 65/80 |
| 11,075,847 B1 * | 7/2021 | Kwan | H04L 47/2441 |
| 2014/0369344 A1 | 12/2014 | Sridhar | |
| 2015/0092585 A1 | 4/2015 | Shao et al. | |

(Continued)

*Primary Examiner* — Melvin H Pollack
(74) *Attorney, Agent, or Firm* — CHRISTENSEN O'CONNOR JOHNSON KINDNESS PLLC

(57) ABSTRACT

A jitter determination method for determining jitter associated with a packet-based data stream is described. The jitter determination method includes, for example, receiving at least two data packets associated with the packet-based data stream; selecting one data packet of the at least two data packets to be a reference data packet; determining initial jitter data based on the at least two data packets, wherein the initial jitter data comprises information on actual arrival times of the at least two data packets, respectively; determining expected arrival times for the at least two data packets, respectively; determining a time bias associated with the packet-based data stream based on at least the determined expected arrival time and based on at least the actual arrival time of the data packet not selected to be the reference data packet; and determining corrected jitter data based on the initial jitter data and based on the determined time bias. Further, a jitter determination circuit and a packet-based data stream receiver are described.

16 Claims, 2 Drawing Sheets

(56) References Cited

U.S. PATENT DOCUMENTS

| | | | |
|---|---|---|---|
| 2015/0172197 A1 | 6/2015 | Sun et al. | |
| 2015/0319212 A1* | 11/2015 | Mani | H04L 47/626 |
| | | | 370/352 |
| 2016/0069676 A1* | 3/2016 | Alsindi | G01S 19/22 |
| | | | 702/94 |
| 2018/0088977 A1* | 3/2018 | Gray | H04L 43/087 |
| 2018/0198596 A1* | 7/2018 | Restle | G06F 1/12 |
| 2018/0287910 A1* | 10/2018 | Sun | H04L 43/087 |
| 2018/0295050 A1 | 10/2018 | Lee et al. | |
| 2018/0302457 A1* | 10/2018 | Hassan | H04L 45/22 |
| 2018/0375744 A1* | 12/2018 | Mayya | H04L 45/302 |
| 2019/0373041 A1* | 12/2019 | Lee | H04L 47/25 |
| 2020/0089981 A1* | 3/2020 | Jengo | G06F 18/25 |
| 2020/0186449 A1* | 6/2020 | Tofighbakhsh | H04L 43/04 |
| 2021/0014144 A1* | 1/2021 | Iwai | H04L 43/0876 |
| 2021/0056430 A1* | 2/2021 | Wu | G06N 3/006 |
| 2021/0153070 A1* | 5/2021 | Velev | H04W 28/0268 |
| 2021/0287731 A1* | 9/2021 | Oh | H03L 7/0812 |
| 2021/0345277 A1* | 11/2021 | Wigren | H04W 56/0045 |
| 2021/0400338 A1* | 12/2021 | Verger | H04N 21/44008 |
| 2021/0409806 A1* | 12/2021 | Merchant | H04N 21/6582 |
| 2022/0124017 A1* | 4/2022 | Pathikonda | H04L 43/065 |
| 2022/0239720 A1* | 7/2022 | Madanapalli | H04L 65/1069 |
| 2022/0303331 A1* | 9/2022 | Svennebring | H04N 21/8456 |
| 2022/0321493 A1* | 10/2022 | Rollet | H04L 47/6275 |
| 2022/0345386 A1* | 10/2022 | Madanapalli | H04L 47/2475 |
| 2022/0353732 A1* | 11/2022 | Filippou | H04W 28/0284 |
| 2022/0373638 A1* | 11/2022 | Chrabieh | H04L 5/0051 |

\* cited by examiner

JITTER DETERMINATION METHOD, JITTER DETERMINATION MODULE, AND PACKET-BASED DATA STREAM RECEIVER

FIELD OF THE DISCLOSURE

Embodiments of the present disclosure generally relate to a jitter determination method for determining jitter associated with a packet-based data stream. Embodiments of the present disclosure further relate to a jitter determination circuit for determining jitter associated with a packet-based data stream, and to a packet-based data stream receiver.

BACKGROUND

One important type of measurement in the context of packet-based data stream quality assessment is the determination of jitter associated with the data packets of the packet-based data stream, i.e. of the variation of the arrival time with respect to the transmission time of the individual data packets.

Usually, one of the data packets is used as a reference in order to extract the jitter from the arrival times of the data packets. For example, it is known to use the arrival time of the first packet in the packet-based data stream to set the time reference and compute the relative arrival times for each of the following packets from that reference time.

However, such an approach does not consider possible global delays that could occur when several packets are stuck in the network and then released suddenly. In that case, it is possible that some arrival times in the jitter file are set to values that are below their theoretical minimum arrival time, i.e. below the sending time plus the minimum possible one-way delay.

Thus, there is a need for a jitter determination method, a jitter determination circuit, and a packet-based data stream receiver that allow for correctly determining the jitter when global delays are present.

SUMMARY

Embodiments of the present disclosure provide a jitter determination method for determining jitter associated with a packet-based data stream. The packet-based data stream comprises several data packets. In an embodiment, the jitter determination method comprises receiving at least two data packets associated with the packet-based data stream;

selecting one data packet of the at least two data packets to be a reference data packet;

determining initial jitter data based on the at least two data packets, wherein the initial jitter data comprises information on actual arrival times of the at least two data packets, respectively;

determining expected arrival times for the at least two data packets, respectively;

determining a time bias associated with the packet-based data stream based on at least the determined expected arrival time and based on at least the actual arrival time of the data packet not selected to be the reference data packet; and determining corrected jitter data based on the initial jitter data and based on the determined time bias.

Therein, the actual arrival time of the data packet not selected to be the reference data packet may be measured relative to the reference data packet. It is emphasized that the reference data packet does not need to be the first data packet of the packet-based data stream.

Accordingly, the actual arrival time of the data packet not selected to be the reference data packet may be smaller than zero if the corresponding packet arrives before the reference data packet, equal to zero if the corresponding packet arrives at the same time as the reference data packet, or bigger than zero if the corresponding packet arrives after the reference data packet. As mentioned above, the actual arrival time may be a relative time, namely relative to the reference data packet.

The expected arrival time may correspond to the arrival time of the respective data packet without any perturbations present in the network, i.e. without jitter and/or any global delays.

The jitter determination method according to embodiments of the present disclosure is based on the idea to determine discrepancies between the expected arrival time(s) and the actual arrival time(s) of the data packets, for example of the at least one data packet not selected to be the reference data packet. Based on these determined discrepancies, the time bias is determined. The time bias accounts for global delays of the data packets, for example if some or all of the data packets were stuck in the transmission network over a certain time and are released simultaneously.

Thus, the jitter associated with the packet-based data stream can be determined correctly by the jitter determination method according to the present disclosure even in the presence of global delays as described above.

It is noted that the jitter data may also be called "jitter vector" in the context of jitter analysis on packet-based data streams.

According to an aspect of the present disclosure, the expected arrival time is determined, for example, based on packet sequence numbers of the at least two data packets, based on the standard used for data transmission and/or based on durations of the at least two data packets. For example, the expected arrival time may be equal to the sending time (i.e. the time at which the packet is sent by the transmitter) plus the minimum one-way delay, i.e. plus the minimum travel time of the respective data packet through the respective transmission network.

In general, the packet sequence numbers determine the correct order of the different data packets, for example according to the standard used for data transmission. Data packets have increasing packet sequence numbers, such that packets sent earlier have a lower packet sequence number than packets sent later.

The expected arrival time may be determined based on a linear function that increases linearly from the actual arrival time of the reference data packet. More precisely, an expected arrival time $t_n$ of a data packet with packet number n may be determined according to the function $t_n = t_r + (n-r) \cdot T_p$, wherein r is the packet sequence number of the reference data packet, $t_r$ is the actual arrival time of the reference data packet, and $T_p$ is a packet duration, i.e. the duration of one data packet in case the packet duration is the same for all packets in the packet-based data stream.

The packet sequence numbers may be determined from the headers of the respective data packets, as the headers usually comprise the packet sequence number.

The packet duration may depend on the standard used for data transmission, as the standard may specify the packet rate $f_p$ and thus the packet duration $T_p = 1/f_p$ in case the packet duration is the same for all packets in the packet-based data stream.

The packet duration can also be derived from timestamps that may be present in the headers according to $T_i=(t_{i+1}-t_i)/F$, wherein $T_i$ is the duration of packet i (in seconds), $t_i$ is the timestamp corresponding to packet i (in timestamp units) and F is the clock rate according to the corresponding data transport protocol (in Hz).

According to another aspect of the present disclosure, the time bias is determined, for example, based on respective deviations between the expected arrival time and the actual arrival time of the data packet not selected to be the reference data packet, for example the expected arrival times and the actual arrival times of the at least two data packets. In other words, the time bias, e.g. due to global delays, is reconstructed based on the discrepancies between the actual arrival time(s) and the expected arrival time(s). By comparing the actual arrival time(s) and the expected arrival time(s) of the data packet(s) not selected to be the reference data packet, conclusions about potential global delays can be drawn.

In an embodiment of the present disclosure, the time bias is a maximum deviation between the expected arrival time and the actual arrival time of the data packet not selected to be the reference data packet, for example the expected arrival times and the actual arrival times across the at least two data packets. In other words, the deviation between the expected arrival time and the actual arrival time is determined for each data packet not selected to be the reference data packet. The time bias is the biggest one of these deviations. It has turned out that by correcting the jitter data this way, no (corrected) arrival time in the corrected jitter data is before the expected arrival time or before a minimum arrival time of the respective data packet.

In a further embodiment of the present disclosure, the corrected jitter data is equal to the initial jitter data if the determined time bias is below a predefined threshold, wherein the corrected jitter data is different from the initial jitter data if the determined time bias is above a predefined threshold. In other words, the jitter data is only corrected if the determined time bias is above the predefined threshold. For example, the predefined threshold may be equal to half a data packet duration, one data packet duration, or m data packet durations, wherein m is an integer greater than or equal to two.

According to a further aspect of the present disclosure, the determined time bias, for example, is added to the arrival times of the data packets, respectively, in order to obtain the corrected jitter data. In other words, the arrival time of each data packet is corrected in the jitter data by adding the time bias to the respective arrival time. Accordingly, the corrected arrival time of each data packet equals the actual arrival time plus the determined time bias.

In some embodiments, the expected arrival times are determined based on the reference data packet. For example, the actual arrival time of the reference data packet may be used as a fix point, wherein the actual arrival time of the reference data packet equals the expected arrival time.

The expected arrival time of the at least one data packet not selected as reference data packet may be determined based on a linear function that increases linearly from the expected arrival time of the reference data packet. More precisely, an expected arrival time $t_n$ of a data packet with packet number n may be determined according to the formula $t_n=t_r+(n-r)\cdot T_p$, wherein r is the packet number of the reference data packet, $t_r$ is the actual arrival time of the reference data packet, and $T_p$ is a packet duration, i.e. the duration of one data packet in case the packet duration is the same for all packets in the packet-based data stream.

The packet duration may depend on the standard used for data transmission, as the standard may specify the packet rate $f_p$ and thus the packet duration $T_p=1/f_p$ in case the packet duration is the same for all packets in the packet-based data stream.

The packet duration can also be derived from timestamps that may be present in the headers according to $T_i=(t_{i+1}-t_i)/F$, wherein $T_i$ is the duration of packet i (in seconds), $t_i$ is the timestamp corresponding to packet i (in timestamp units) and F is the clock rate according to the corresponding transport protocol (in Hz).

In a further embodiment of the present disclosure, the time bias is determined if at least one actual arrival time is before the corresponding expected arrival time. Accordingly, the time bias may only be determined if there is a need to correct the jitter data, namely due to the at least one actual arrival time being before the corresponding expected arrival time. On the other hand, the time bias may not be determined if there is no need to correct the jitter data, as all actual arrival times are already equal to or after the respective expected arrival times.

The packet-based data stream may be based on the Real-Time Transport Protocol (RTP), the QUIC protocol, and/or the Transmission Control Protocol (TCP), for example wherein the packet-based data stream is a voice data stream, an image data stream, a video data stream, a music data stream and/or a media data stream. In some embodiments, the packet-based data stream may comprise an arbitrary combination of voice data streams, image data streams, video data streams, music data streams and/or media data streams.

According to an aspect of the present disclosure, a quality of the packet-based data stream can be assessed, for example, based on the corrected jitter data. The corrected jitter data comprises additional information on the time bias, and thus additional information on potential global delays of the packet-based data stream. Thus, the quality of the packet-based data stream can be assessed more precisely based on the additional information regarding the time bias.

In some embodiments, a voice quality, an image quality, a video quality, a data quality, a music quality and/or a media quality may be assessed.

According to another aspect of the present disclosure, minimum arrival times of the at least two data packets, for example, are determined, wherein the corrected jitter data is determined based on the determined minimum arrival times. For example, the minimum arrival time may be equal to the sending time (i.e. the time at which the packet is sent by the transmitter) plus the minimum one-way delay, i.e. plus the minimum travel time of the respective data packet. Accordingly, the minimum arrival time may be used as the expected arrival time for the respective data packet.

Embodiments of the present disclosure further provide a jitter determination circuit for determining jitter associated with a packet-based data stream. The packet-based data stream comprises several data packets. In an embodiment, the jitter determination circuit comprises at least one signal input, an initial jitter sub-circuit, a time bias sub-circuit, and a correction sub-circuit. The signal input is configured to receive the at least two data packets associated with the packet-based data stream. The initial jitter sub-circuit is configured to select one data packet of the at least two data packets to be a reference data packet. The initial jitter sub-circuit further is configured to determine initial jitter data based on the at least two data packets, wherein the initial jitter data comprises information on actual arrival times of the at least two data packets, respectively. The time bias sub-circuit is configured to determine expected arrival times for the at least two data packets, respectively. The time bias sub-circuit further is configured to determine a time bias associated with the packet-based data stream based on at least the determined expected arrival time and based on at least the actual arrival time of the data packet not selected to be the reference data packet. The correction sub-circuit is configured to determine corrected jitter data based on the initial jitter data and based on the determined time bias.

In some embodiments, the jitter determination circuit may be configured to perform any one of the jitter determination methods described above.

Regarding the advantages and further properties of the jitter determination circuit, reference is made to the explanations given above with respect to the jitter determination method, which also hold for the jitter determination circuit and vice versa.

According to an aspect of the present disclosure, the corrected jitter data, for example, is equal to the initial jitter data if the determined time bias is below a predefined threshold, wherein the corrected jitter data is different from the initial jitter data if the determined time bias is above a predefined threshold. In other words, the jitter data is only corrected if the determined time bias is above the predefined threshold. For example, the predefined threshold may be equal to half a data packet duration, one data packet duration, or m data packet durations, wherein m is an integer greater than or equal to two.

Embodiments of the present disclosure further provide a packet-based data stream receiver. In an embodiment, the packet-based data stream receiver comprises at least one signal input and any one of the jitter determination circuits described above.

In some embodiments, the packet-based data stream receiver may be configured to perform any one of the jitter determination methods described above.

Regarding the advantages and further properties of the packet-based data stream receiver, reference is made to the explanations given above with respect to the jitter determination method and the jitter determination circuit, which also hold for the packet-based data streamreceiver and vice versa.

In an embodiment of the present disclosure, the jitter determination circuit is located downstream of the at least one signal input. Accordingly, the jitter determination circuit is integrated into the packet-based data streamreceiver. In some embodiments, the packet-based data stream receiver may comprise a housing, and the jitter determination circuit may be arranged within the housing.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
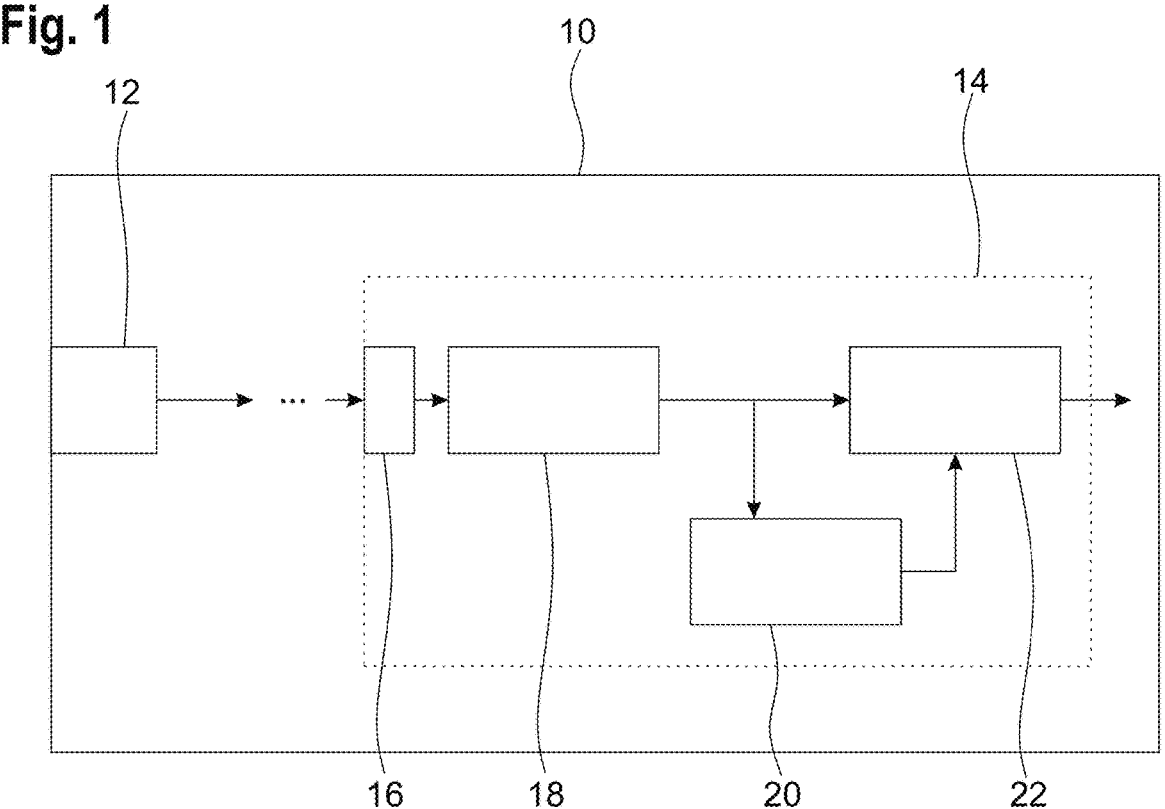
FIG. 1 schematically shows a packet-based data receiver according to an embodiment of the present disclosure.

FIG. 1 schematically shows an example of a packet-based data receiver 10. In general, the packet-based data receiver 10 is configured to receive and process packet-based data streams.

The packet-based data streams may each be based on the Real-Time Transport Protocol (RTP), the QUIC protocol, and/or the Transmission Control Protocol/TCP). For example, the packet-based data streams may each be a voice data stream, an image data stream, a video data stream, a music data stream and/or a media data stream. In some embodiments, the packet-based data streams may comprise an arbitrary combination of voice data streams, image data streams, video data streams, music data streams and/or media data streams.

The packet-based data stream receiver 10 may be connected to a data transmission network, such as a computer network and/or a server network, for example to the world wide web. In the embodiment shown, the packet-based data stream receiver 10 comprises at least one signal input 12 and a jitter determination circuit 14.

The jitter determination circuit 14 is connected to the at least one signal input 12, wherein the jitter determination circuit 14 is located downstream of the at least one signal input 12. The jitter determination circuit 14 may be connected to the at least one signal input 12 directly or via other electronic components of the packet-based data stream receiver 10.

In the embodiment shown, the jitter determination circuit 14 comprises a signal input 16, an initial jitter sub-circuit 18, a time bias sub-circuit 20, and a correction sub-circuit 22.

Figure 2:
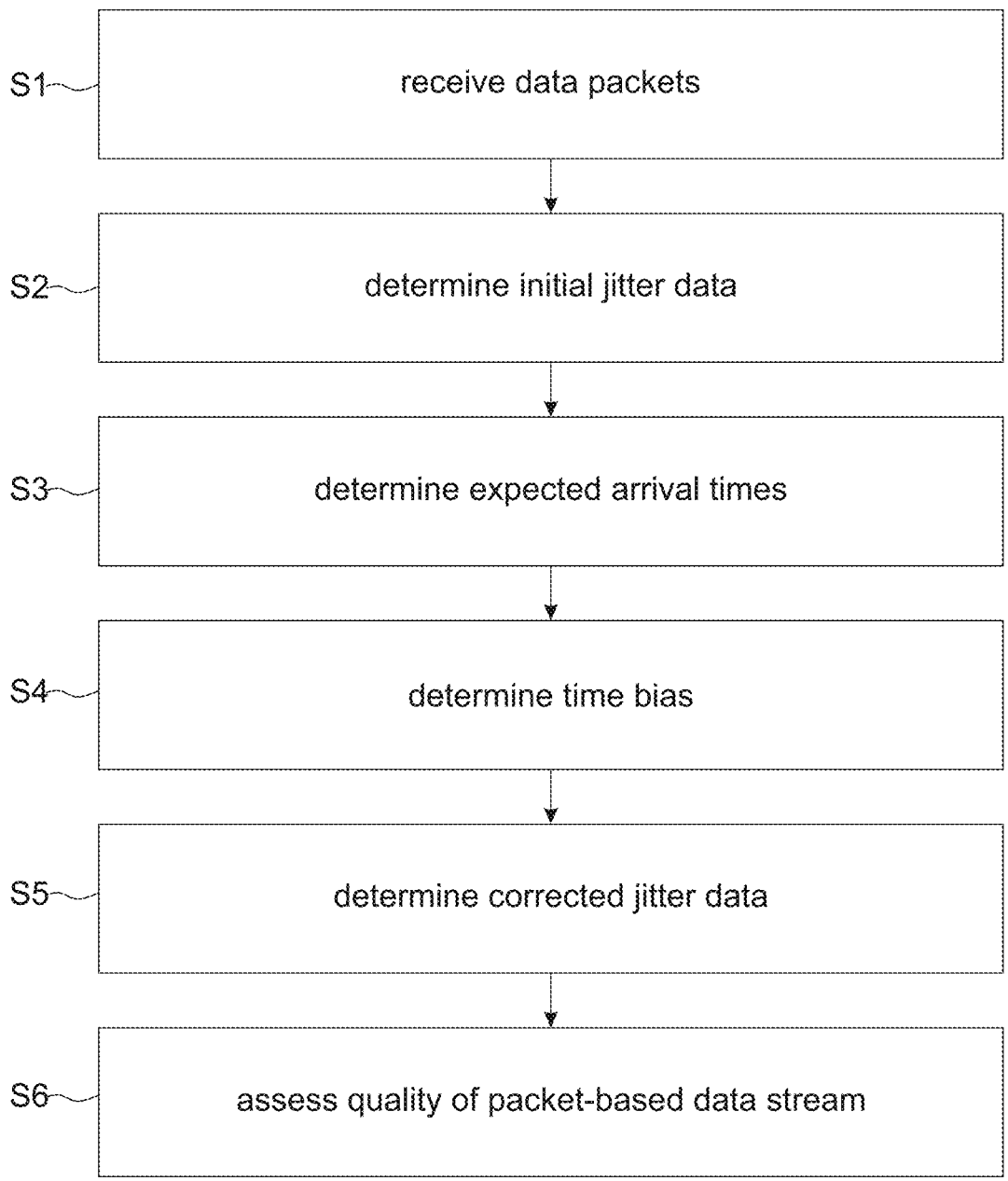
FIG. 2 schematically shows a flow chart of a jitter determination method according to an embodiment of the present disclosure.

The packet-based data stream receiver 10 or the jitter determination circuit 14 is configured to determine jitter associated with at least one packet-based data stream received by the packet-based data stream receiver 10. More precisely, the jitter determination circuit 14 is configured to perform a jitter determination method for determining jitter associated with a packet-based data stream, an example of which is described in the following with reference to FIG. 2.

At least one packet-based data stream is received by the signal input 16 of the jitter determination circuit 14 (step S1).

Beforehand, the packet-based data stream may be received by the at least one signal input 12 of the packet-based data stream receiver 10, optionally pre-processed by further electronic components of the packet-based data stream receiver 10, and forwarded to the jitter determination circuit 14.

Initial jitter data is determined by the initial jitter sub-circuit 18 (step S2).

The initial jitter data comprises information on actual arrival times of the data packets associated with the at least one packet-based data stream received. In other words, the actual arrival times of the received data packets are determined in order to determine the initial jitter data.

Therein, one of the received data packets is selected to be a reference data packet. The actual arrival times of the data packets not selected as reference data packet may be measured relative to the arrival time of the reference data packet.

For example, the actual arrival time of the reference data packet may be set to zero. Accordingly, the actual arrival times of the data packets not selected to be the reference data packet may be smaller than zero if the corresponding packet arrives before the reference data packet, equal to zero if the corresponding packet arrives at the same time as the reference data packet, or bigger than zero if the corresponding packet arrives after the reference data packet.

Figure 3:
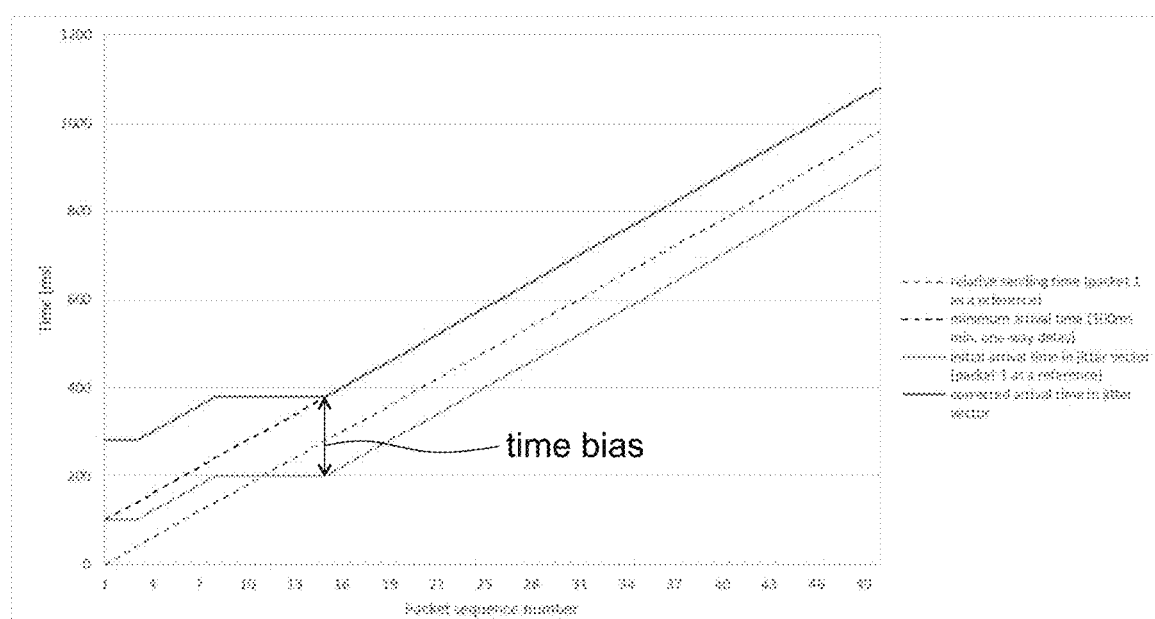
FIG. 3 shows a representative diagram of arrival times of data packets plotted against packet number.

This is illustrated in FIG. 3, which shows a plot of the actual arrival times (labelled as "initial arrival time") of the data packets plotted against the packet sequence number.

In the particular example shown in FIG. 3, the data packet with packet sequence number 1 is selected to be the reference data packet. However, it is to be understood that any one of the other data packets may be selected as reference data packet instead.

Expected arrival times of the received data packets not selected to be the reference data packet are determined by the time bias sub-circuit 20 (step S3).

In general, the expected arrival times may correspond to the arrival times of the respective data packets without any perturbations present in the transmission network, i.e. without jitter or and/or global delays. Thus, the expected arrival times may be equal to the respective sending times (i.e. the time at which the respective packet is sent by the transmitter) plus the minimum one-way delay, i.e. plus the minimum travel time of the respective data packet.

This is illustrated in FIG. 3, which shows a plot of the expected arrival times (labelled as "minimum arrival time") of the data packets plotted against the packet sequence number.

FIG. 3 further shows a plot of the sending times (labelled as "relative sending time") of the data packets plotted against the packet sequence number.

The expected arrival time may be a linear function that increases linearly from the actual arrival time of the reference data packet. Thus, for the reference data packet, the expected arrival time may be set to be equal to the actual arrival time.

More precisely, an expected arrival time $t_n$ of a data packet with packet number n may be determined according to the formula $t_n = t_r + (n-r) \cdot T_p$, wherein r is the packet sequence number of the reference data packet, $t_r$ is the actual arrival time of the reference data packet, and $T_p$ is a packet duration, i.e. the duration of one data packet in case the packet duration is the same for all packets in the packet-based data stream.

The packet sequence numbers may be determined from the headers of the respective data packets, as the headers usually comprise the packet sequence number.

The packet duration may depend on the standard used for data transmission, as the standard may specify the packet rate $f_p$ and thus the packet duration $T_P = 1/f_p$ in case the packet duration is the same for all packets in the packet-based data stream.

The packet duration can also be derived from timestamps that may be present in the headers according to $T_i = (t_{i+1} - t_i)/F$, wherein $T_i$ is the duration of packet i (in seconds), $t_i$ is the timestamp corresponding to packet i (in timestamp units) and F is the clock rate according to the corresponding data transport protocol (in Hz).

A time bias associated with the packet-based data stream is determined by the time bias sub-circuit 20 based on determined expected arrival times of the received data packets and based on the determined actual arrival times of the data packets not selected to be the reference data packet (step S4).

In general, the actual arrival times and the expected arrival times of the data packets, for example of the data packets not selected as a reference data packet, are compared in order to determine the time bias. In some embodiments, the time bias is a maximum deviation between the expected arrival times and the actual arrival times of the data packet not selected to be the reference data packet, for example the expected arrival times and the actual arrival times across all of the received data packets. In other words, the respective deviation between the expected arrival time and the actual arrival time is determined for each data packet not selected to be the reference data packet.

As is illustrated in FIG. 3, the time bias is determined to be the biggest one of these deviations. Optionally, the time bias may only be determined if at least one of the actual arrival time is smaller than the corresponding expected arrival time.

Accordingly, the time bias may only be determined if there is a need to correct the jitter data, namely due to the at least one actual arrival time being before the corresponding expected arrival time. On the other hand, the time bias may not be determined if there is no need to correct the jitter data, as all actual arrival times are already equal to or after the respective expected arrival times.

Corrected jitter data is determined by the correction sub-circuit based on the determined initial jitter data and the determined time bias by the correction sub-circuit 22 (step S5).

More precisely, the determined time bias is added to the arrival times of the data packets, respectively, in order to obtain the corrected jitter data. In other words, the arrival time of each data packet is corrected in the jitter data by adding the time bias to the respective arrival time. Accordingly, the corrected arrival time of each data packet equals the actual arrival time plus the determined time bias.

This is illustrated in FIG. 3, which shows a plot of the corrected arrival times (labelled as "corrected arrival time in jitter vector") of the data packets plotted against the packet sequence number.

In the resulting corrected jitter data, no (corrected) arrival time is below the corresponding expected arrival time. Thus, global delays are correctly accounted for in the corrected jitter data, such that no corrected arrival time is before the expected arrival time or even before the sending time.

Optionally, the corrected jitter data may only be determined if the determined time bias is above a predefined threshold. Accordingly, the initial jitter data may only be corrected if there is a need to correct the jitter data. For example, the predefined threshold may be equal to half a data packet duration, one data packet duration, or m data packet durations, wherein m is an integer greater than or equal to two.

A quality of the packet-based data stream may be assessed based on the corrected jitter data (step S6).

It is noted that the quality of the packet-based data stream may be assessed based on the initial jitter data if the time bias has not been determined because no actual arrival time was before the expected arrival time, or if the time bias was below the predefined threshold.

The corrected jitter data comprises additional information on the time bias, and thus additional information on potential global delays of the packet-based data stream. Thus, the quality of the packet-based data stream can be assessed more precisely based on the additional information regarding the time bias.

In some embodiments, a voice quality, an image quality, a video quality, a data quality, a music quality and/or a media quality may be assessed.

As mentioned above, the jitter determination circuit 14 is configured to (e.g., programmed to) determine jitter associated with a packet-based data stream, wherein the packet-based data stream comprises several data packets. In a certain embodiment, the jitter determination circuit 14 is configured to (e.g., programmed to) receive at least two data packets associated with the packet-based data stream; select one data packet of the at least two data packets to be a reference data packet; determine initial jitter data based on the at least two data packets, wherein the initial jitter data comprises information on actual arrival times of the at least two data packets, respectively; determine expected arrival times for the at least two data packets, respectively; determine a time bias associated with the packet-based data stream based on at least the determined expected arrival time and based on at least the actual arrival time of the data packet not selected to be the reference data packet; and determine corrected jitter data based on the initial jitter data and based on the determined time bias.

In some embodiments, the jitter determination circuit 14 includes one or more processor circuits and a memory storing program instructions. The program instructions, when executed by the one or more processor circuits, is configured to carry out the technologies and methodalogies set forth herein. In a certain embodiment, the program instructions are stored on a non-transitory computer readable media. The the program instructions, when executed by the one or more processor circuits, is configured to carry out any one of the methods, or steps thereof, set forth in Claims 1-14. In that regard, the one or more processor circuits and/or memory storing the program instructions forms a special purpose circuit specifically configured to carry out the methodologies and technologies described herein.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In certain embodiments, circuitry includes special purpose hardware circuit implementations (e.g., implementations in analog circuitry, implementations in digital circuitry, and the like, and combinations thereof) specifically configured to carry out the methodologies and technologies described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, a system, a computing device, a computing entity, and/or the like executing instructions stored on computer-readable storage media to perform certain steps or operations. The computer-readable media include cooperating or interconnected computer-readable media, which exist exclusively on a processing or processor system or circuit or distributed among multiple interconnected processing or processor systems or circuits that may be local to, or remote from, the processing or processor system or circuits. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be, in some embodiments, implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es), processor circuits, etc., to cause a series of operational steps to be performed on the one or more computers or computing devices or other programmable data processing apparatus(es), processor circuits, etc., to produce a computer-implemented process such that the instructions that execute on the one or more computers or computing devices or other programmable data processing apparatus(es), processor circuits, etc., provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

All of the features disclosed above with respect to the example embodiments and/or the accompanying FIGURES can alone or in any sub-combination be combined with features of the aspects of the present disclosure including features of preferred embodiments thereof.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A jitter determination method for determining jitter associated with a packet-based data stream, wherein the packet-based data stream comprises several data packets, the jitter determination method comprising:
   receiving at least two data packets associated with the packet-based data stream;
   selecting one data packet of the at least two data packets to be a reference data packet;
   determining initial jitter data based on the at least two data packets, wherein the initial jitter data comprises information on actual arrival times of the at least two data packets, respectively;
   determining expected arrival times for the at least two data packets, respectively;
   determining a time bias associated with the packet-based data stream based on at least the determined expected arrival time and based on at least the actual arrival time of the data packet not selected to be the reference data packet, wherein the time bias is determined based on respective deviations between the expected arrival times and the actual arrival times of at least two data packets not selected to be the reference data packet; and
   determining corrected jitter data based on the initial jitter data and based on the determined time bias, wherein the determined time bias is added to the arrival times of the data packets, respectively, thereby obtaining the corrected jitter data.

2. The jitter determination method of claim 1, wherein the expected arrival time is determined based on packet sequence numbers of the at least two data packets, based on the standard used for data transmission and/or based on durations of the at least two data packets.

3. The jitter determination method of claim 1, wherein the time bias is determined based on respective deviations between the expected arrival time and the actual arrival time of the data packet not selected to be the reference data packet.

4. The jitter determination method of claim 3, wherein the time bias is a maximum deviation between the expected arrival time and the actual arrival time of the data packet not selected to be the reference data packet.

5. The jitter determination method of claim 3, wherein the time bias is a maximum deviation between the expected arrival times and the actual arrival times across at least two data packets not selected to be the reference data packet.

6. The jitter determination method of claim 1, wherein the corrected jitter data is equal to the initial jitter data if the determined time bias is below a predefined threshold, and wherein the corrected jitter data is different from the initial jitter data if the determined time bias is above a predefined threshold.

7. The jitter determination method of claim 1, wherein the expected arrival times are determined based on the reference data packet.

8. The jitter determination method of claim 1, wherein the time bias is determined if at least one actual arrival time is before the corresponding expected arrival time.

9. The jitter determination method of claim 1, wherein the packet-based data stream is based on the Real-Time Transport Protocol (RTP), the QUIC protocol, and/or the Transmission Control Protocol/TCP).

10. The jitter determination method of claim 1, wherein the packet-based data stream is a voice data stream, an image data stream, a video data stream, a music data stream and/or a media data stream.

11. The jitter determination method of claim 1, wherein a quality of the packet-based data stream is assessed based on the corrected jitter data.

12. The jitter determination method of claim 1, wherein minimum arrival times of the at least two data packets are determined, and wherein the corrected jitter data is determined based on the determined minimum arrival times.

13. A jitter determination circuit for determining jitter associated with a packet-based data stream, wherein the packet-based data stream comprises at least two data packets, the jitter determination circuit comprising electronic components including:
   at least one signal input configured to receive the at least two data packets associated with the packet-based data stream;
   an initial jitter sub-circuit configured to select one data packet of the at least two data packets to be a reference data packet, wherein the initial jitter sub-circuit is further configured to determine initial jitter data based on the at least two data packets, wherein the initial jitter data comprises information on actual arrival times of the at least two data packets, respectively;
   a time bias sub-circuit configured to determine expected arrival times for the at least two data packets, respectively, wherein the time bias sub-circuit is further configured to determine a time bias associated with the packet-based data stream based on at least the determined expected arrival time and based on at least the actual arrival time of the data packet not selected to be the reference data packet, wherein the time bias sub-circuit is configured to determine the time bias based on respective deviations between the expected arrival times and the actual arrival times of at least two data packets not selected to be the reference data packet; and
   a correction sub-circuit configured to determine corrected jitter data based on the initial jitter data and based on the determined time bias, wherein the correction sub-circuit is configured to add the determined time bias to the arrival times of the data packets, respectively, thereby obtaining the corrected jitter data.

14. The jitter determination circuit of claim 13, wherein the corrected jitter data is equal to the initial jitter data if the determined time bias is below a predefined threshold, and wherein the corrected jitter data is different from the initial jitter data if the determined time bias is above a predefined threshold.

15. A packet-based data stream receiver, comprising at least one signal input and the jitter determination circuit according to claim 13.

16. The packet-based data stream receiver of claim 15, wherein the jitter determination circuit is located downstream of the at least one signal input.

* * * * *